July 3, 1923.

R. TAEUBERT 1,460,620

AUTOMOBILE SIGNAL

Filed May 29, 1919

INVENTOR

R. TAEUBERT

BY Joseph J. O'Brien

ATTORNEY

Patented July 3, 1923.

1,460,620

UNITED STATES PATENT OFFICE.

RICHARD TAEUBERT, OF HOLYOKE, MASSACHUSETTS.

AUTOMOBILE SIGNAL.

Application filed May 29, 1919. Serial No. 300,793.

*To all whom it may concern:*

Be it known that I, RICHARD TAEUBERT, a citizen of the United States of America, and resident of Holyoke, in the county of Hampden and State of Massachusetts, have invented certain new and useful Improvements in Automobile Signals, of which the following is a full, clear, and exact description.

This invention relates to improvements in automobile traffic signals and its leading object is to provide a simple device which will enable the driver to positively signal a traffic officer as to the direction which the automobile is to go, and which is so constructed that the driver will have direct manual control of the indicator forming a part of the signal; the signal being also equipped with means for locking the indicator in set position, and for illuminating the field of the signal so that the illuminated portion will attract the traffic officer or other person and the direction of travel of the automobile will be readily understood.

With the above and other objects in view the invention consists of certain new and useful combinations and arrangements of parts, clearly described in the following specification and fully illustrated in the accompanying drawings, in which:—

Figure 1:
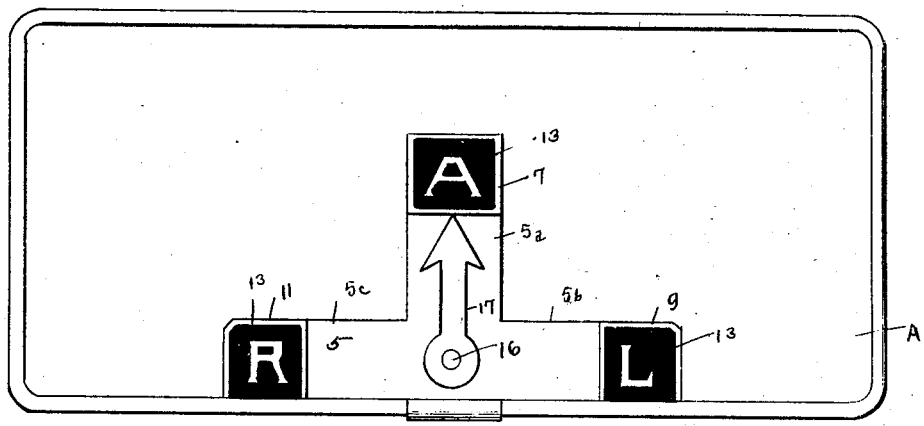
Fig. 1 is a front elevation showing the device applied to an automobile windshield.

Referring to the accompanying drawings, A designates a windshield of any type. To the frame of this windshield the signal holding frame 5 is clamped, bolted or otherwise secured.

The frame 5 is shown to be in the form of an inverted T, so as to provide an upstanding central arm $5^a$, a left signal arm $5^b$ and a right signal arm $5^c$. The terminal portion of the arm $5^a$ is provided with a pendant or overhanging portion 7 and supports the electric lamp 8. This pendant portion 7 carries a vertical signal element indicated at 13, which is shown to be in the form of the letter A, arranged upon a piece of glass or other material through which rays of lights from the lamp 8 may be projected. The tip of the arm $5^b$ is provided with a smaller protecting frame 9 which is employed where an electric lamp is located and this tip or terminal carries the translucent signal element $13^a$ on which the letter L is arranged. The terminal portion of the arms $5^c$ is provided with a smaller signalling element $13^b$ arranged on the terminal frame or extension 11, and the element $13^b$ carries a signal in the form of the letter R indicating right, while the letter L indicates left.

Figure 4:
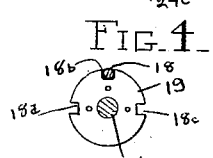
Fig. 4 is a transverse sectional view thereof.

The wall $5^a$ is connected to an auxiliary rear wall 15 and in the registered openings provided in the two walls the signal shaft 16 is mounted for rotation. This signal shaft 16 carries on its forwardly end the signal arrow or pointer 17 which works directly under the lamp 8. A coil spring 20 engages the shaft 16 and bears on its forward end against the wall $5^a$ and on its rearward end against the stop 21 so as to hold the latch pin 18 in either of the notches $18^a$, $18^b$, and $18^c$ of the disk 19 which is mounted against the wall $5^a$ so as to occupy a stationary position. The shaft 16 is provided on its rear end with a handle $18^x$ whereby the indicator may be turned to various positions. By projecting the shaft 16 forwardly the pin 18 will be shifted out of engagement with either of the notches $18^a$, $18^b$ or $18^c$, as shown in Fig. 4 and the arrow 17 may be rotated.

Figure 2:
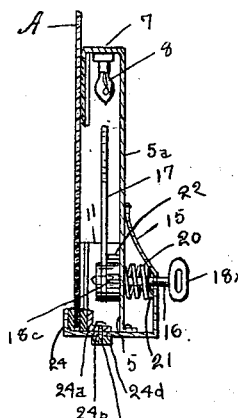
Fig. 2 is a central vertical sectional view thereof.
Figure 3:
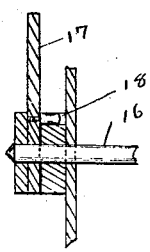
Fig. 3 is a detail vertical sectional view through the signal arm pivot taken on an enlarged scale.

The frame 5 is shown to include clamping members consisting of an upstanding flange 24 formed in said frame and adapted to have gripping engagement with the lower edge of the windshield frame in cooperation with the clamping element or flange $24^a$ which is secured by the screw $24^c$ of the clamping nut $24^d$ from the opening $24^b$ formed in the base of the frame 5 as shown in Fig. 2. Any other arrangement may be used for clamping the signal to the windshield.

Having described my invention, I claim:

1. A traffic signal consisting of a frame adapted to be secured to a windshield or vehicle part and provided with a non-rotatable member having notches in its edge radially spaced from each other, a pivot extending through said member, an indicator carried by said pivot and provided with a pin to engage either one of said notches, a spring for holding the pin engaged with either notch to retain the indicator in selected position.

2. A traffic signal consisting of a frame, a pivot mounted thereon, a member secured to said frame and surrounding said member and provided with radially spaced notches in its edge, an indicator mounted on said pivot and having means to engage either of said notches, said spring asserting tension on the pivot to hold said indicator in selected position by retaining said means in either one of the notches and said indicator being manually movable when said pivot is shifted on the frame.

3. A traffic signal consisting of a frame having right and left position symbols or the like and a forward position signal or the like, and indicating arrow or the like adapted to swing into alignment with either one of said position symbols, a pivot slidably mounted on the frame and carrying said indicator, a notched member secured to the frame, a pin carried by the indicator for engaging various portions of the notched member and a spring surrounding the pivot and adapted to hold the pin in latched engagement with the notched member.

Signed by me at Springfield, Mass.

RICHARD TAEUBERT.